Patented May 18, 1954

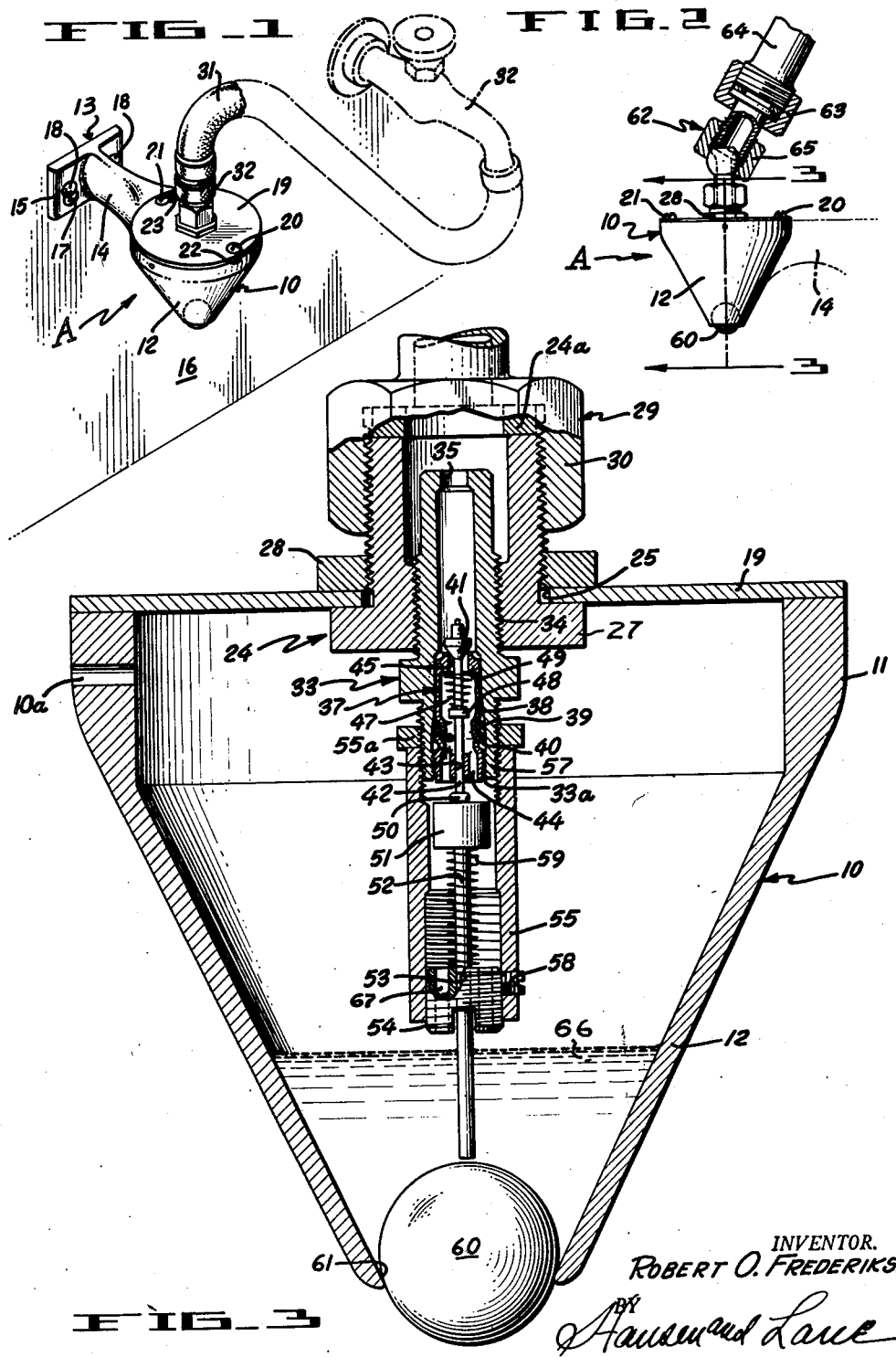

2,678,630

UNITED STATES PATENT OFFICE 2,678,630

WATERING DEVICE FOR DOMESTIC HOUSE ANIMALS

Robert O. Frederiksen, Mountain View, Calif.

Application November 14, 1952, Serial No. 320,369

5 Claims. (Cl. 119—75)

The present invention relates to a drinking device and pertains more particularly to a drinking fountain for domestic animals such as dogs.

Various stock and poultry watering devices have been developed in the past, but most such devices have been unsuited for the use of domestic house animals, such as dogs and cats.

The present invention contemplates the provision of an improved watering device for domestic house animals. The invention also provides for a watering device for such animals which may be directly connected to a domestic water supply system so as to make constantly available a supply of fresh drinking water which is protected from contamination by dust or insects.

It is also an object of the invention to provide an improved watering device which has a properly shaped discharge orifice to encourage a dog to use it, and which has a positive, accurate and long-lived valve and actuating mechanism incorporated therein. It is also an object of the invention to provide a drinking fountain wherein the pressure required to actuate the water release valve mechanism may be accurately and positively controlled to encourage an animal to use the device. It is a still further object to provide a drinking device which is simple and inexpensive to make, and which may be easily disassembled for maintenance and repair.

These and other objects and advantages of the invention will be apparent from the following description and the accompanying drawings, wherein:

Fig. 1 is a perspective view of one embodiment of the drinking device as it appears set up for use, a hose connection to a domestic water supply system being indicated in broken lines.

Fig. 2 is a side elevational view of the drinking device shown in Fig. 1, but with a modified arrangement for connection to the water supply system.

Fig. 3 is an enlarged fragmentary vertical sectional view taken along line 3—3 of Fig. 2, the portion shown in Fig. 3 being common to both Figs. 1 and 2.

The drinking device A comprises a housing 10 having a cylindrical upper portion 11 and a truncated, inverted, conical lower portion 12. A vent 10a is provided near the upper end of the housing to prevent the building up of pressure therein. A bracket 13 may be cast integral with the housing 10, or if desired, may be constructed separately and secured thereto by screws, not shown, in a conventional manner.

The bracket 13 has smoothly contoured arm 14 formed integrally with a wall plate portion 15. Key-hole slots 17 are provided in the wall plate 15 for mounting the bracket on a wall 16 by screws 18. A cover plate 19 is mounted across the open upper end of the housing 10 by screws 20 and 21. The screw 20 fits into a notch 22 in the cover plate, and the screw 21 fits into a key-hole slot 23 in a manner commonly employed for mounting the covers on electrical outlet boxes.

A flanged end threaded fitting 24 (Fig. 3) is inserted upwardly through a central opening 25 in the cover 19, the flange 27 around the lower end of the fitting being of larger diameter than the hole 25. A nut 28 is screwed onto the upper threaded portion of the fitting 24 to clamp the cover 19 between the nut 28 and the flange 27. A hose connection adapter 29 of a conventional type has a nut portion 30 thereof screwed onto the threaded fitting 24. A washer 24a provides a watertight seal between the fitting 24 and the adapter 29. The adapter 29 may be connected to a hose 31 by means of a usual threaded, knurled ring 32 which comprises a part of the adapter 29. The hose 31 may be connected to a usual hose bibb 32 of a conventional type. To avoid building up pressure within the housing 10, a vent hole 10a is provided near the upper end thereof.

The valve structure for controlling the flow of water to the device comprises a tubular water passage fitting 33 having a taper threaded upper portion 34 which is screwed into a correspondingly threaded opening provided therefor in the lower end of the threaded fitting 24. A water inlet opening 35 is provided into the upper end of the tubular member 33.

A valve assembly 37, which is here illustrated as corresponding to the valve insides of a type commonly used in automobile tire valves, is screwed into a threaded opening provided therefor in the lower end of the fitting 33. The valve assembly 37 comprises a sleeve 38 having a rubber sealing ring 39 mounted in a groove provided therefor in the sleeve. The sealing ring 39 has a sealing fit against a tapered seat 40 provided therefor interiorly of the tubular fitting 33 above an internally threaded lower end portion 33a thereof.

A valve head 41 is mounted on the upper end of a valve stem 42 which is slidably mounted in an opening 43 provided therefor in the lower end of the sleeve 38. A plurality of discharge openings 44 are provided in the otherwise solid lower end portion of the sleeve 38 around the valve stem 42. The valve head 41 seats on the upper rim of a water passage 45 provided in the upper end of the valve sleeve 38.

A light coil spring 47 of corrosion resistant material is held in compression between a collar 48 secured to the valve stem 42, and an inwardly offset seat 49 near the upper end of the sleeve 38. An enlarged portion 50 is provided on the lower end of the valve stem 42 and rests on an enlarged head portion 51 secured to the upper end of a valve actuating pin 52. The head portion 51 is of sufficient weight to urge the pin 52 to gravitate toward a lowered position.

The valve actuating pin 52 is slidably mounted in a central opening 53 in a threaded plug 54, which is screwed into the internally threaded lower end portion of an extension 55. The extension tube 55 is screwed onto the threaded lower end portion 57 of the tubular fitting 33, and is locked in axially adjusted position thereon by a lock nut 55a.

The plug 54 is secured in adjusted position in the extension 55 by a set screw 58. A light coil spring 59 is held in compression between the enlarged head portion 51 on the upper end of the valve actuating stem 52 and the plug 54. The compression of the spring 59 may be adjusted by loosening the set screw 38, adjusting the plug 54 axially of the tube 55, and again tightening the set screw.

A valve ball 60 which may be a bearing ball of the type used in large ball bearings, rests on a seat 61 provided therefor internally of the truncated conical lower portion 12 of the housing 10. The valve actuating pin 52 is of a length to just clear, by a few thousandths of an inch, the upper end of the ball 60, when the valve head 41 is seated on the upper end of the sleeve 38.

The operation of the device is as follows:

In mounting the drinking device as shown in Fig. 1, the bracket plate 15 is secured by screws 18 to a suitable vertical surface such as the wall 16 indicated in Fig. 1. The device should be mounted with its lower end at approximately the height of the shoulder of the dog for which it is intended. This height is not essential, since it has been found that with the device installed approximately 14" off the ground it may be used by practically all sizes of dogs. The device then may be connected to a conventional hose bibb 32 by a suitable length of hose 31.

The usual valve of the bibb 32 then may be turned on to admit water under pressure through the hose 31, the threaded fitting 24 and the opening 35 at the upper end of the threaded fitting 33 to the valve head 41.

To insure satisfactory operation of the device, after it has been installed, connected, and the water turned on as described in the foregoing paragraphs, the valve action may be tested by raising the ball 60 with the finger. A light touch should raise the ball 60 sufficiently to cause the valve actuating pin 52 to elevate the valve stem 42 and raise the valve head 41 from its seat to permit water to flow under pressure through the sleeve 38, the lower extension 55 and through a plurality of holes 67 in the plug 54 into the housing 10. If too much pressure is required to raise the ball and open the valve, the entire valve and cover assembly may be removed by loosening the screws 20 and 21 to permit the cover to be swung about the screw 20 as a pivot to bring the screw 21 into the enlarged portion of the key-hole slot 23 and thus free the cover for removal by withdrawing it from engagement by the screw 20.

The set screw 58 then may be loosened and the plug 54 may be screwed outwardly to release the tension on the spring 59 by a desired amount. To reduce pressure, the process is reversed.

To provide the proper few thousandths of an inch clearance between the lower end of the valve actuating pin 52 and the ball 60, the lock nut 55a may be loosened, and the threaded tube 55 screwed upwardly or downwardly as required. Upon again assemblying the top 19 with the housing 10 as shown in Fig. 1, the device is ready for use.

With ordinary water pressures such as are commonly employed in domestic water supply systems, a small amount of water 66 usually will be present in the lower portion of the housing 10. This water is retained in the housing by the ball valve 60, and is desirable since it provides a reservoir which will cause an immediate flow of water as soon as the ball 60 is raised by the first lick of the animal's tongue. This supply is constantly replenished each time the ball 60 is raised to raise the valve head 41 from its seat.

The dog is taught to drink by the owner who brings the dog to the drinking device and works the ball a few times with his finger. He then encourages the dog to lick the lower end of the housing 12 and the ball 60. This may be made easier by rubbing the lower end of the housing 10 with a piece of meat. As soon as the dog discovers that the water flows when he licks the lower end of the housing, he will use the drinking device readily and without further encouragement. If more than one dog uses the device, it is necessary to instruct only one of the dogs, since the others learn from him by example.

The modified water connection shown in Fig. 2 permits the drinking device to be mounted directly on a pipe or hose bibb without the use of the bracket 13 shown in Fig. 1. In this modified form of the device, a ball and socket adapter 62 of a type commonly employed for mounting shower heads is provided on the lower end of a hose connector ring 63 of a conventional type. By mounting the device on an ordinary hose bibb 64 the housing 10 may be swung to bring the axis of the housing 10 to a vertical position. By then tightening the connector ring 65 of the ball and socket adapter 62, the housing 10 is secured in upright position.

The valve, not shown, of the hose bibb 64 then may be opened to introduce the water under pressure to the valve head 41 as shown in Fig. 3, whereupon after adjusting the device as described previously herein, and raising the ball valve to introduce a small amount of water into the lower end of the housing, the device is ready for use.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. A watering device for domestic animals comprising a vented housing open at its upper and lower ends, a valve seat formed within the open lower end of said housing, a valve seated on said seat to have its lower side exposed below the housing, a cover removably mounted over the upper end of said housing, a tubular member having a water passage therethrough mounted to extend through said cover into the interior of said housing, a valve mounted in said tubular member to control the flow of water therethrough, a valve actuating member mounted to extend to a point closely adjacent the lower valve when the cover is mounted on the housing, biasing means mounted to urge the valve actuating member toward the water control valve to facilitate operation of the water valve by an animal licking the exposed lower valve, and coupling means mounted on the tubular valve passage member for connection to a supply of water under pressure.

2. An arrangement according to claim 1 and including an adjustable element mounted adjacent the biasing means for movement toward and away from said biasing means to vary the biasing force of said biasing means on the valve actuating member.

3. A watering device for domestic animals comprising a vented housing open at its upper and lower ends, a valve seat formed within the open lower end of said housing, a valve seated by gravity on said seat to have its lower side exposed below the housing, a cover removably mounted over the upper end of said housing, a tubular member having a water passage therethrough mounted to extend through said cover into the interior of said housing, a valve mounted in said water passage member to control the flow of water therethrough, a threaded continuation of the water passage member beyond the valve therein, a valve actuating member mounted in said continuation to extend to a point closely adjacent the lower valve when the cover is mounted on the housing, a plug threadedly mounted in adjusted position in said continuation, a spring mounted in compression between said plug and the valve actuating member to bias the valve actuating member toward the water control valve to facilitate operation of the water valve by an animal licking the exposed lower valve, and coupling means mounted on the tubular member for connection to a supply of water under pressure.

4. A watering device for domestic house animals comprising a vented housing having a discharge opening in its lower end, a valve seat formed to surround said opening, a valve seated on said seat and exposed below the lower end of said housing for elevation from its seat by the licking of an animal, a water conduit opening into the interior of said housing above the ball, a water control valve mounted in said conduit to control the flow of water therethrough into the housing, a water control valve actuating member mounted for axial slidable movement between the water control valve and the ball for operation of the valve upon elevation of the ball from its seat, a threadedly adjustable member having an opening therein slidably to receive the valve actuating member, a biasing spring held in adjusted position between the threadedly adjustable member and the valve actuating member adjustably to control actuation of the water valve by elevation of the valve ball from its seat, and coupling means mounted on the conduit exteriorly of the housing for connection to a supply of water under pressure.

5. A watering device for domestic animals comprising a vented housing open at its lower end, a valve seat formed within the open lower end of said housing, a valve seated on said seat to have its lower side exposed below the housing for elevation of the valve from its seat by an animal licking said lower end valve, a tubular conduit opening interiorly of said housing, a valve mounted in said conduit to control the flow of water therethrough, a valve actuating member mounted to extend from said water valve to a point closely adjacent the lower valve, biasing means mounted interiorly of said housing with one end thereof supported by the housing and the other end thereof positioned to urge the water control valve toward open position to facilitate operation of the water control valve by an animal licking the exposed lower end valve, and coupling means mounted on the conduit for connection to a supply of water under pressure.

References Cited in the file of this patent

UNITED STATES PATENTS

| Number | Name | Date |
| --- | --- | --- |
| 2,307,220 | Hewitt | Jan. 5, 1943 |

FOREIGN PATENTS

| Number | Country | Date |
| --- | --- | --- |
| 26,012 | Australia | Apr. 3, 1930 |
| 641,507 | Great Britain | Aug. 16, 1950 |